(12) United States Patent
Hirai et al.

(10) Patent No.: US 7,808,547 B2
(45) Date of Patent: Oct. 5, 2010

(54) LENS APPARATUS AND IMAGE-TAKING APPARATUS INCLUDING DRIVE RANGE LIMITING FUNCTION HAVING VALID AND INVALID STATES

(75) Inventors: Keisuke Hirai, Tochigi (JP); Kazumasa Yoshikawa, Tochigi (JP)

(73) Assignee: Canon Kabushiki Kaisha (JP)

( * ) Notice: Subject to any disclaimer, the term of this patent is extended or adjusted under 35 U.S.C. 154(b) by 1375 days.

(21) Appl. No.: 10/858,154

(22) Filed: Jun. 1, 2004

(65) Prior Publication Data

US 2004/0246365 A1 Dec. 9, 2004

(30) Foreign Application Priority Data

Jun. 3, 2003 (JP) .............................. 2003-157543
May 10, 2004 (JP) .............................. 2004-139682

(51) Int. Cl.
G03B 13/00 (2006.01)
H04N 5/232 (2006.01)
H04N 5/238 (2006.01)
G03B 17/00 (2006.01)

(52) U.S. Cl. ....................... 348/369; 348/347; 348/345; 396/72; 396/76; 396/77; 396/86; 396/87

(58) Field of Classification Search ................... 396/72, 396/87; 348/369
See application file for complete search history.

(56) References Cited

U.S. PATENT DOCUMENTS

| | | | | |
|---|---|---|---|---|
| 5,065,172 A | * | 11/1991 | Ogawa | ......................... 396/82 |
| 5,243,372 A | * | 9/1993 | Suzuki et al. | ................. 396/76 |
| 6,035,137 A | | 3/2000 | Kaneko et al. | |
| 6,268,967 B1 | | 7/2001 | Kubo | ......................... 359/696 |
| 2002/0025151 A1 | * | 2/2002 | Numako et al. | ............... 396/87 |
| 2002/0122665 A1 | * | 9/2002 | Suzuki | ........................ 396/72 |
| 2003/0174233 A1 | * | 9/2003 | Onozawa | .................... 348/349 |

FOREIGN PATENT DOCUMENTS

| | | |
|---|---|---|
| EP | 0 869 669 | 10/1998 |
| EP | 1 081 524 | 3/2001 |
| JP | 08334674 | 12/1996 |
| JP | 11-160604 A | 6/1999 |
| JP | 2000-284164 | 10/2000 |

OTHER PUBLICATIONS

European Search Report dated Sep. 15, 2004.

* cited by examiner

*Primary Examiner*—Lin Ye
*Assistant Examiner*—Chia-Wei A Chen
(74) *Attorney, Agent, or Firm*—Rossi, Kimms & McDowell LLP

(57) ABSTRACT

A drive control apparatus for a lens apparatus having a zoom lens movable between a telephoto end and a wide-angle end according to the present invention comprises a selecting member which selects a zoom position between the telephoto end and the wide-angle end, a controller which has a drive range limiting function of controlling drive of the zoom lens by using the selected zoom position as a drive end, and a drive range switch member which switches the drive range limiting function between an invalid state and a valid state. The controller drives the zoom lens to the drive end when the drive range limiting function is switched to the valid state.

6 Claims, 14 Drawing Sheets

(PRIOR ART)

(PRIOR ART)

(PRIOR ART)

(PRIOR ART)

LENS APPARATUS AND IMAGE-TAKING APPARATUS INCLUDING DRIVE RANGE LIMITING FUNCTION HAVING VALID AND INVALID STATES

BACKGROUND OF THE INVENTION

1. Field of the Invention

The present invention relates to a lens apparatus for use in a video camera lens, a video camera, a television camera lens or a television camera, and to an image-taking apparatus having the lens apparatus and a photoelectric conversion element which photoelectrically converts a subject image formed by the lens apparatus.

2. Description of the Prior Art

In recent years, in a zoom lens for use in a broadcast television camera such as an ENG camera, a zoom track function provided for a zooming control accessory mountable on the zoom lens has allowed setting a limit value on the drive range of the zoom lens. An operation example of the zoom track function of this type is described below with reference to FIGS. 9 to 13.

FIGS. 9 to 13 are schematic diagrams and block diagrams showing the appearance of an ENG lens which supports the conventional zoom track function (for example, see Japanese Patent Application Laid-Open No. 2000-284164). In FIGS. 9 to 13, reference numeral 1 shows a zoom lens for use in a broadcast television camera such as an ENG camera, 2 a lens barrel, 3 a drive unit, 4 a focus ring, 5 a zoom ring, 6 an iris ring, 7 an extender lever, 8 a zoom preset speed mode switch lever, 9 a frame preset switch, 10 a memory switch, 11 a send-back switch, 12 a zoom operation switch, 13 an iris operation change switch, 14 an iris momentary auto-switch, 15 a focus speed adjustment trimmer, 16 an iris gain adjustment trimmer, 17 a zoom mode adjustment trimmer, 18 a focus servo/manual switch knob, 19 and 20 zoom remote and focus remote 20-pin connectors, 21 a zoom remote 8-pin connector, 22 a zoom speed adjustment volume, 23 a zoom servo/manual switch knob, 24 a macro-button, 25 a shuttle shot switch, 26 a DIP switch unit, 27 a VTR switch, 28 a DIP switch I, 29 a DIP switch II, 30 a DIP switch III, 31 a DIP switch IV, 32 a DIP switch V, 33 a DIP switch VI, 34 a DIP switch VII, 35 a DIP switch VIII, 36 a zoom operation control accessory, 37 a 20-pin connector, 38 a zoom remote operation switch, 39 a zoom track telephoto position adjustment remote volume, 40 a zoom track wide-angle position adjustment remote volume, 41 a zoom track function valid/invalid remote switch, and 42 a zoom track valid indicator.

Although the internal structure of the lens barrel 2 is not shown, the lens barrel 2 has, in order from an object side, a fixed focus lens, a movable focus lens, a zoom lens, an iris, a relay lens and the like provided therein, and an extender is disposed behind them. The focus ring 4 is rotated around an optical axis to move the movable focus lens forward and backward in the optical axis direction to achieve focusing. The zoom ring 5 is rotated around the optical axis to move the zoom lens forward and backward in the optical axis direction to achieve zooming.

The iris ring 6 is rotated around the optical axis to adjust the diaphragm diameter of the iris. The drive unit 3 is mounted on a side portion of the lens barrel 2. The drive unit 3 has a focus drive motor, not shown, arranged therein. The drive force of the focus drive motor is transmitted to the focus ring 4 through a transmission mechanism, not shown, to drive the focus ring 4 for rotation around the optical axis. Alternatively, the focus ring 4 may be rotated manually without mounting the focus drive motor on the drive unit 3, by way of example.

The drive unit 3 has a zoom drive motor arranged therein. The drive force of the zoom drive motor is transmitted to the zoom ring 5 through a transmission mechanism, not shown, to drive the zoom ring 5 for rotation about the optical axis.

Similarly, the drive unit 3 has an iris drive motor, not shown, arranged therein. The drive force of the iris drive motor is transmitted to the iris ring 6 through a transmission mechanism, not shown, to drive the iris ring 6 around the optical axis.

The zoom operation switch 12 is formed on the drive unit 3. The zoom operation switch 12 is pressed to a telephoto side or a wide-angle side to drive the zoom ring 5, thereby moving the zoom lens toward the telephoto side or wide-angle side. A zoom drive speed can be adjusted in accordance with the amount of pressing (the operation amount) of the zoom operation switch 12. As the pressing amount is larger, the zoom drive speed is higher. The frame preset switch 9 can be pressed to move the zoom lens to a previously stored zoom position. The zoom drive speed in this case can be changed by operating the speed mode switch lever 8. Specifically, the zoom drive speed can be changed to one of the highest possible speed or a preset speed.

The send-back switch 11 can be turned on to display return video on a viewfinder. The iris operation switch 13 can be flipped to switch between manual and servo operations of the iris.

While the iris auto-switch 14 is ON, the iris operation is switched to a servo operation. The set zoom position or the zoom drive speed are set by simultaneously operating the memory switch 112 and the shuttle shot switch 25, the frame preset switch 9 or the zoom operation switch 12. A zoom or focus operation control accessory (20-pin) is connected to the zoom remote and focus remote 20-pin connectors 19 and 20.

The focus servo/manual switch knob 18 can be flipped to switch between manual and servo operations of the focus. A zoom operation control accessory (8-pin) is connected to the zoom remote 8-pin connector 21. The zoom speed adjustment volume 22 adjusts the speed over the entire zoom range when a zoom operation is performed by the zoom operation switch 12. The zoom servo/manual switch knob 23 can be flipped to switch between manual and servo operations of the zoom. The macro-button 24 is used when a user intends to take a closeup of a subject located closer than the closest focusing distance. A built-in extender is operated by manipulating the extender lever 7. A focus speed is adjusted by the focus speed adjustment trimmer 15. An iris servo gain is adjusted by the iris gain adjustment trimmer 16. The zoom mode adjustment trimmer 17 is used to adjust a change caused by the zoom speed adjustment volume 22. The zoom lens is moved forward and backward at the highest speed to zoom positions which are stored corresponding to ON/OFF of the shuttle switch 25. The DIP switches 28 to 34 are used to perform various setting such as a function assignment to the VTR switch 27 and the like. The DIP switch 35 is not assigned any setting item. The VTR switch 27 is used to perform a start operation or a stop operation of a VTR. The zoom remote operation switch 38 is disposed swingably with a neutral position as a reference. When the zoom remote operation switch 38 is pressed to the telephoto side or wide-angle side, the zoom ring 5 is rotated to the telephoto side or wide-angle side. A zoom drive speed can be adjusted by the amount of pressing (the operation amount) of the zoom remote operation switch 38. As the pressing amount is larger, the zoom speed is higher. The zoom operation control accessory 36 is connected to the zoom remote and focus remote 20-pin connectors 19 and 20 through the 20-pin connector 37 of the zoom operation control accessory 36. The zoom track telephoto position is adjusted by operating the zoom track telephoto position adjustment remote volume 39 of the zoom operation control accessory 36, and the zoom track wide-angle position is adjusted by operating the zoom track wide-angle position adjustment remote volume 40. As a result, the drive range of the zoom lens can be set. The zoom track function can be switched between valid and invalid states by operating the zoom track function valid/invalid remote switch 41 of the zoom operation control accessory 36. In addition, the valid or invalid state of the zoom track function can be checked through the zoom track valid indicator 42 mounted on the zoom operation control accessory 36.

The aforementioned conventional example, however, has the following disadvantages since the drive unit alone cannot set the zoom track position.

Specifically, since the zoom operation control accessory (20-pin) is necessary to use the zoom track function, the zoom lens on which the accessory is mounted has poor portability. Especially when a user shoulders the lens to take images for news and the like without using a tripod, the user has great difficulty in using the zoom track function. Also, the drive unit has a number of the operation switches thereon as described above, and it is extremely difficult to newly provide a zoom track position adjustment volume and a zoom track function switch in limited space on the drive unit. In addition, erasing the stored zoom track position requires another memory operation by setting the telephoto end or wide-angle end as a zoom track position, involving significant effort. Moreover, the valid or invalid state of the zoom track function can be checked only through the zoom track valid indicator mounted on the zoom operation control accessory (20-pin), and if the zoom track function is realized by the drive unit alone, no means for checking is provided.

It is a first object of the present invention to allow realization of a zoom track function by a drive unit alone without newly adding an operation switch and with a minimum required amount of operation.

It is a second object of the present invention to separately enable erasure of stored contents of zoom track positions and switch between valid and invalid states of the zoom track function only with an operation switch on the drive unit and through a minimum required amount of operation.

It is a third object of the present invention to allow visual recognition of switch between valid and invalid states of the zoom track function without newly mounting an indicator on the drive unit.

SUMMARY OF THE INVENTION

To achieve the aforementioned objects, according to one aspect, the present invention provides a drive control apparatus for a lens apparatus having a zoom lens movable between a telephoto end and a wide-angle end, the drive control apparatus comprising a selecting member which selects a zoom position between the telephoto end and the wide-angle end, a controller which has a drive range limiting function of controlling drive of the zoom lens by using the selected zoom position as a drive end, and a drive range switch member which switches the drive range limiting function between an invalid state and a valid state. The controller drives the zoom lens to the drive end when the drive range limiting function is switched to the valid state.

DETAILED DESCRIPTION OF THE PREFERRED EMBODIMENTS

Embodiment 1

Method of Storing Central Reference

Figure 15:
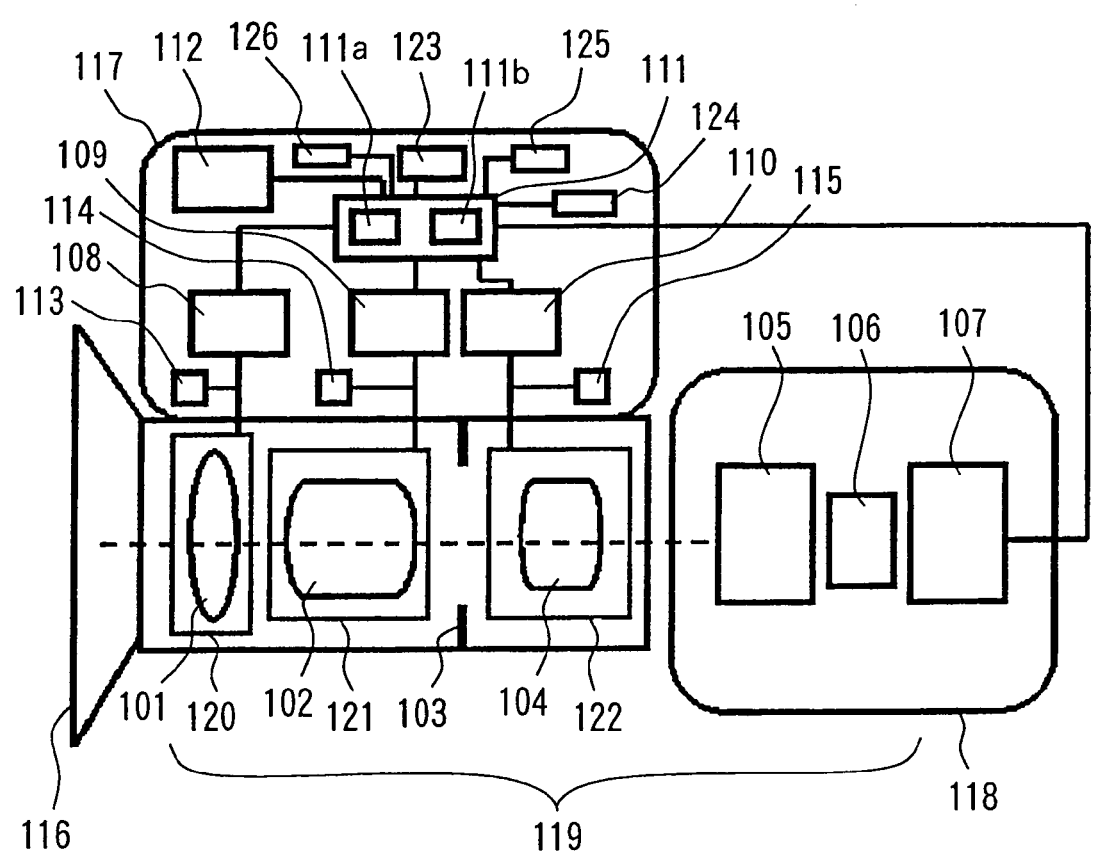
FIG. 15 is a functional block diagram showing an image-taking system in Embodiments 1 to 3.

FIG. 15 shows the structure of an image-taking system according to Embodiments 1 to 3 of the present invention. In FIG. 15, reference numeral 118 shows a camera (an image-taking apparatus) such as a television camera and a video camera, and reference numeral 116 shows a lens apparatus mounted on the camera.

Reference numeral 117 shows a drive unit (a drive control apparatus) mounted on the lens apparatus 116. The lens apparatus 116 and the drive unit 117 constitute a zoom lens system.

An image-taking system 119 is formed of the lens apparatus 116, the drive unit 117, and the camera 118. However, the present invention is applicable to a lens apparatus of a type which contains the function of a drive unit in a zoom lens.

The lens apparatus 116 of Embodiment 1 is formed in order from an object side to an image plane side as follows. Reference numeral 101 shows a lens unit, the entirety or part of which is moved in an optical axis direction to achieve manual focusing. The MF lens unit 101 is driven by mechanically transmitting rotation of a manual focus operation ring (not shown) provided for the lens apparatus 116 or converting the rotation into an electric signal to drive a motor.

Reference numeral 102 is a variable power lens unit (a zoom lens), the entirety or part of which is moved in the optical axis direction to provide variable power. Reference numeral 103 shows a diaphragm unit (an iris) for adjusting an amount of light. Reference numeral 104 shows a lens unit, the entirety or part of which is moved in the optical axis direction to realize auto-focusing. These lens units and the diaphragm unit 101 to 104 constitute an image-taking optical system. The lens apparatus of Embodiment 1 is of a type which achieves a for-element focusing scheme and a rear focusing scheme in combination.

Reference numeral 121 shows a variable power drive mechanism (for example, a cam) for driving the variable power lens unit 102 in the optical axis direction, and 120 an MF drive mechanism for driving the MF lens unit 101 in the optical axis direction. Reference numeral 122 shows an AF drive mechanism for driving the AF lens unit 104 in the optical axis direction. These drive mechanisms 120 to 122 are activated in response to drive force from the drive unit 117.

In the drive unit 117, reference numeral 109 shows a variable power control section which includes a zoom actuator such as a motor which is a drive source of the variable power lens unit 102 and its drive circuit. Reference numeral 110 shows an AF control section which includes an AF actuator which is a drive source of the AF lens unit 104 and its drive circuit. Reference numeral 108 shows an MF control section which includes an MF actuator which is a drive source of the MF lens unit 101 and its drive circuit. While a control section which includes an actuator and its drive circuit, not shown, is provided for the diaphragm unit 103, the diaphragm unit 103 can be driven by mechanical transmission of manual operation force.

Reference numeral 114 shows a zoom position detector such as an encoder and a potentiometer which is coupled to the variable power drive mechanism 121 and detects the position of the variable power lens unit 102. Reference numeral 113 shows an MF position detector such as an encoder which is coupled to the MF drive mechanism 120 and detects the position of the MF lens unit 101. Reference numeral 115 shows an AF position detector such as an encoder which is coupled to the AF drive mechanism 122 and detects the position of the AF lens unit 104.

Reference numeral 111 shows a lens control circuit serving as a controller which controls various operations of the drive unit 117. The lens control circuit 111 contains a CPU 111a which performs various operational processing and a storage section 111b which stores zoom track positions (later described) and the like.

Reference numerals 112, 123, 124 and 125 show a memory switch, an iris auto-switch, a zoom operation switch and a DIP switch VIII provided for the drive unit 117, respectively, and details thereof are later described.

In the camera 118, reference numeral 105 shows a glass block corresponding to an optical filter or a color separation prism. Reference numeral 106 shows an image-pickup device such as a CCD sensor and a CMOS sensor which photoelectrically converts a subject image formed by the image-taking optical system. Reference numeral 107 shows a camera control circuit controls the whole camera 118. The camera control circuit 107 contains a CPU (not shown) which performs various operational processing, an image processing circuit which performs various image processing on an image-pickup signal from the image-pickup device 106, and the like.

In the following, Embodiment 1 of the present invention is described with reference to FIGS. 1 to 3 and FIG. 15.

Figure 1:
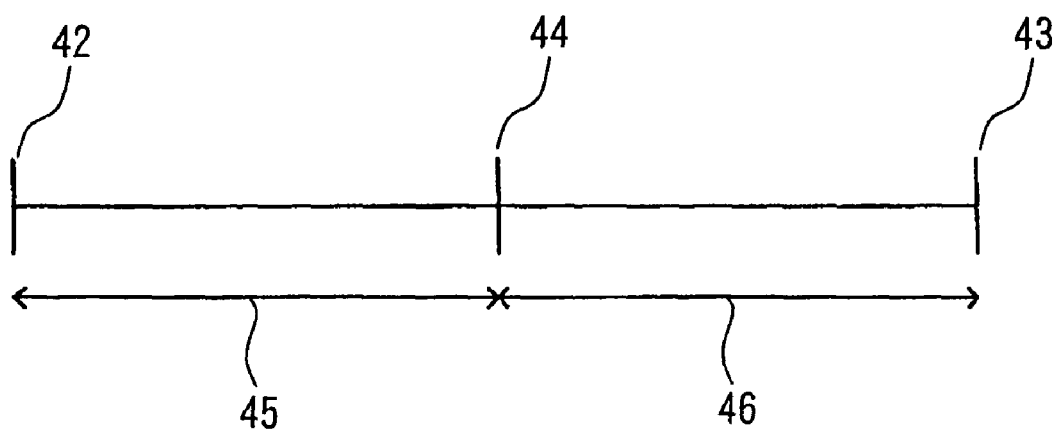
FIG. 1 shows a drive range of a variable power lens unit of Embodiments 1 to 3 of the present invention.

FIG. 1 shows the drive range of the variable power lens unit 102. Reference numeral 42 shows a telephoto end, 43 a wide-angle end, 44 an intermediate point between the telephoto end 42 and the wide-angle end 43, 45 a telephoto area from the telephoto end 42 to the intermediate point 44, and 46 a wide-angle area from the wide-angle end 43 to the intermediate point 44.

Processing in Embodiment 1 can be divided into storage processing of zoom track positions and drive processing of the variable power lens unit. First, the procedure of the zoom track storage processing is described with reference to FIGS. 1 and 15. When the memory switch 112 and the iris auto-switch 123 are simultaneously turned on, the position of the variable power lens unit 102 at that point is stored as a zoom track telephoto position if the position falls within the telephoto area 45, or as a zoom track wide-angle position if the position falls within the wide-angle area 46 in the storage section 111b such as an EEPROM.

Next, the flow of zoom track drive processing is described. When the zoom operation switch 124 is flipped to the telephoto side, the variable power lens unit 102 is driven until the variable power lens unit 102 reaches the zoom track telephoto position. When the zoom operation switch 124 is flipped to the wide-angle side, the variable power lens unit 102 is driven until the variable power lens unit 102 reaches the zoom track wide-angle position.

In other words, in Embodiment 1, the two zoom track positions of the telephoto direction and wide-angle direction can be stored in the storage section 111b by simultaneously operating the memory switch 112 and the iris auto-switch 123.

Figure 2:
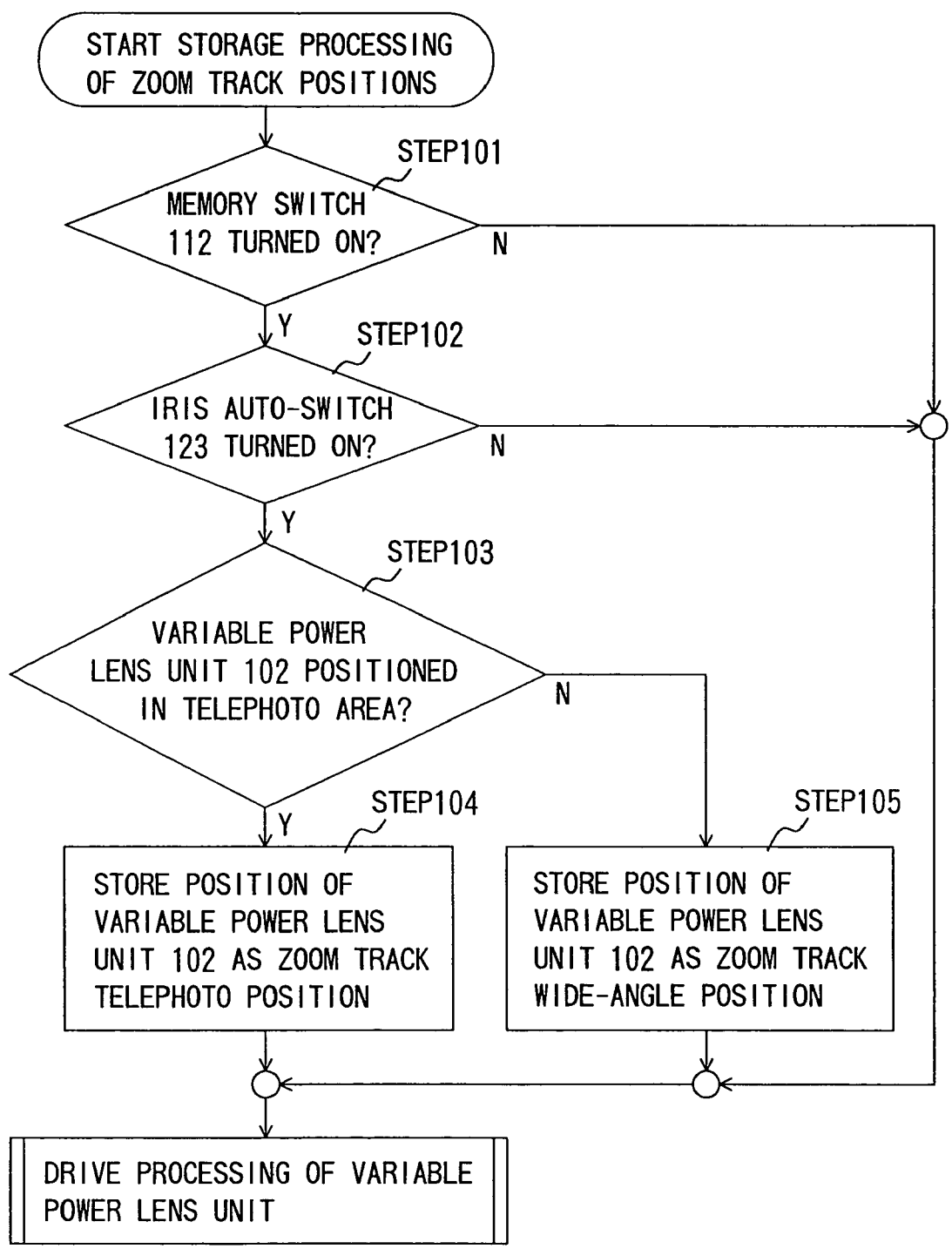
FIG. 2 is a flow chart showing the storage processing procedure of zoom track positions in Embodiment 1 of the present invention.

FIG. 2 is a flow chart showing the store processing procedure of the zoom track positions in the aforementioned storage processing. The flow chart is performed by the controller 111. At step 101, when the memory switch 112 is turned on, the flow proceeds to step 102, or when it is not turned on, the flow proceeds to drive processing of the variable power lens unit shown in FIG. 3.

Figure 3:
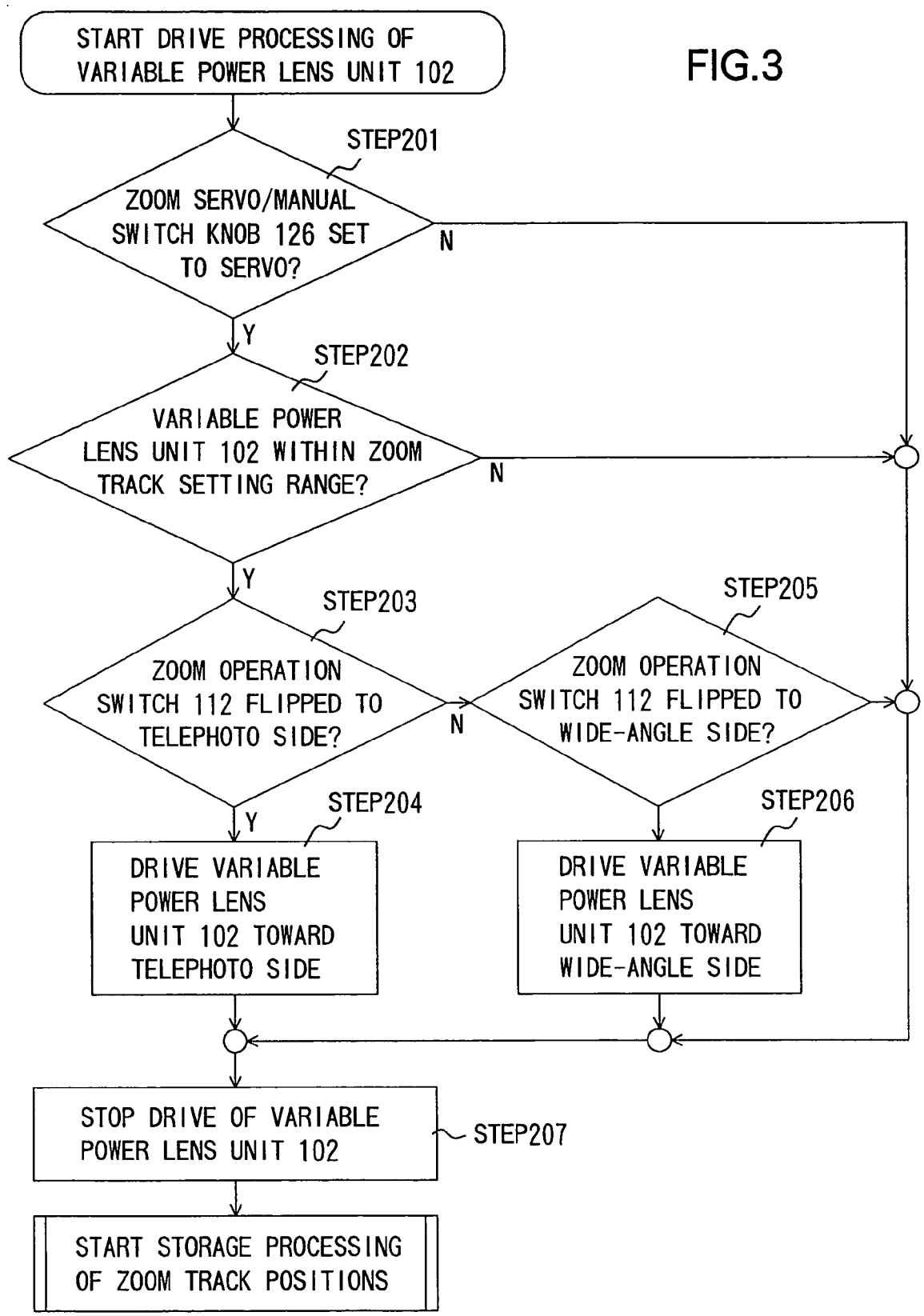
FIG. 3 is a flow chart showing the drive processing procedure of the variable power lens unit in Embodiment 1 of the present invention.

At step 102, when the iris auto-switch 123 is turned on, the flow proceeds to step 103, or when it is not turned on, the flow proceeds to the drive processing of the variable power lens unit shown in FIG. 3.

At step 103, when the variable power lens unit 102 is positioned in the telephoto area 45, the flow proceeds to step 104, or when it is positioned in the wide-angle area 46, the flow proceeds to step 105. At step 104, the position of the variable power lens unit 102 is stored as the zoom track telephoto position, and at step 105, the position of the variable power lens unit 102 is stored as the zoom track wide-angle position in the storage section 111b. Upon completion of the storage processing, the flow proceeds to the drive processing of the variable power lens unit shown in FIG. 3.

Next, the drive processing procedure of the variable power lens unit is described with reference to FIG. 3. FIG. 3 is a flow chart showing the control procedure of the variable power lens unit 102. The flow chart is performed by the controller 111. At step 201, when the zoom servo/manual switch knob 126 is set to the servo position, the flow proceeds to step 202, or when the zoom servo/manual switch knob 126 is set to the manual position, the flow proceeds to step 207.

At step 202, when the variable power lens unit 102 is positioned within a zoom track setting range, the flow proceeds to step 203, or when the variable power lens unit 102 is out of the zoom track setting range, the flow proceeds to step 207.

At step 203, when the zoom operation switch 124 is flipped to the telephoto side, the flow proceeds to step 204. When the zoom operation switch 124 is flipped to the wide-angle side, the flow proceeds to step 205.

At step 204, the variable power lens unit 102 is driven toward the telephoto side, and then the flow proceeds to step 207. At step 205, when the zoom operation switch 124 is flipped to the wide-angle side, the flow proceeds to step 206, or when the zoom operation switch 124 is flipped to the telephoto side, the flow proceeds to step 207. At step 206, the variable power lens unit 102 is driven toward the wide-angle side, and then the flow proceeds to step 207. At step 207, the drive of the variable power lens unit 102 is stopped to start the storage processing of the zoom track position shown in FIG. 2.

In this manner, the storage processing of the positions of the variable power lens unit 102 is provided for the two areas, that is, the telephoto area and the wide-angle area, separated by using the intermediate point 44 between the telephoto end 42 and the wide-angle end 43 as the boundary. The memory switch 112 and the iris auto-switch 123 are simultaneously operated to allow the two zoom track positions on the telephoto side and the wide-angle side to be stored in the storage section 111b without newly adding a switch.

In Embodiment 1, when the variable power lens unit 102 is positioned at the intermediate point 44, the position is stored as the zoom track wide-angle position in the storage section 111b. In this case, however, the position may be stored as the zoom track telephoto position, or the zoom track position storage processing may be exited to start the zoom track lens drive processing.

In addition, in Embodiment 1, the storage processing for one of the two zoom track positions in the telephoto area and the wide-angle area is selectively used in accordance with the position of the variable power lens unit 102. However, the storage processing for one of the two zoom track positions may be selectively used in accordance with an operation method of the switch, for example, the memory switch 112 held on for a certain time period or turned on continuously a plurality of times.

According to the aforementioned structure, an operator can set the zoom track positions before images are taken only by the single memory switch 112, resulting in easier operations and allowing the operator to concentrate on other operations. In addition, the space for arranging the switches can be saved and the part cost can be reduced to cause improved cost performance of products.

Embodiment 2

Method of Initializing Memory and Switching Valid and Invalid

In the following, Embodiment 2 of the present invention is described with reference to FIGS. 1, 4, 5, and 15. When the DIP switch VIII 125 (a drive range switch member) is turned on, the zoom track function is turned on. When the DIP switch VIII 125 is turned off, the zoom track function is turned off to erase the stored contents of zoom track positions.

On the other hand, when a certain time period elapses with the memory switch 112 and the iris auto-switch 123 turned on, the zoom track function becomes invalid if it is valid, or becomes valid if it is invalid.

In other words, in Embodiment 2, it is possible to set switching between a valid state and an invalid state of the zoom track function and erasure of the stored contents of the zoom track positions.

Similarly to Embodiment 1, processing in Embodiment 2 can be divided into storage processing of zoom track positions and drive processing of the variable power lens unit. First, the flow of the storage processing in blocks is described with reference to FIGS. 1 and 4. When the DIP switch VIII 125 is turned off, the zoom track function is turned off to erase the stored contents of the zoom track positions. When a certain time period elapses with the memory switch 112 and the iris auto-switch 123 turned on while the DIP switch VIII 125 is turned on, the zoom track function becomes invalid if it is valid, or becomes valid if it is invalid.

When both of the memory switch 112 and the iris auto-switch 123 are turned off within a certain time period after the memory switch 112 and the iris auto-switch 123 are turned on, the position of the variable power lens unit 102 is stored as the zoom track telephoto position if the position of the variable power lens unit 102 falls within the telephoto area 45, or the position of the variable power lens unit 102 is stored as the zoom track wide-angle position if the position of the variable power lens unit 102 falls within the wide-angle area 46.

In other words, in Embodiment 2, the zoom track positions can be initialized without performing resetting of the zoom track positions at the telephoto end and the wide-angle end or switching of the power. In addition, switching between the valid and invalid states of the zoom track function can be realized without initializing the zoom track positions.

Figure 4:
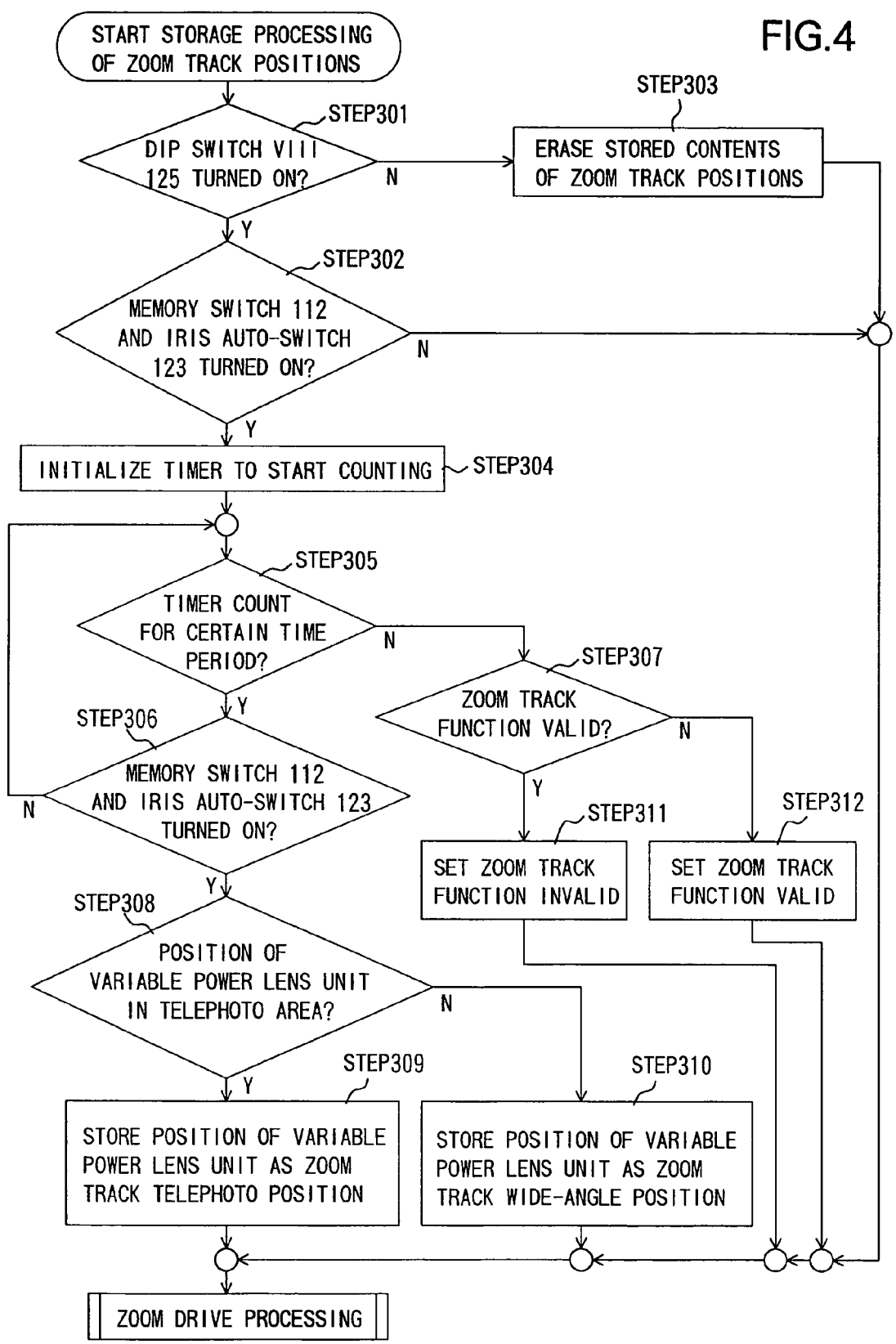
FIG. 4 is a flow chart showing the storage processing procedure of zoom track positions in Embodiment 2 of the present invention.

FIG. 4 is a flow chart showing the storage processing procedure of the zoom track positions in the aforementioned storage processing. The flow chart is performed by the controller 111. In FIG. 4, at step 301, when the DIP switch VIII 125 is turned on, the flow proceeds to step 302. When the DIP switch VIII 125 is not turned on, the flow proceeds to step 303.

Figure 5:
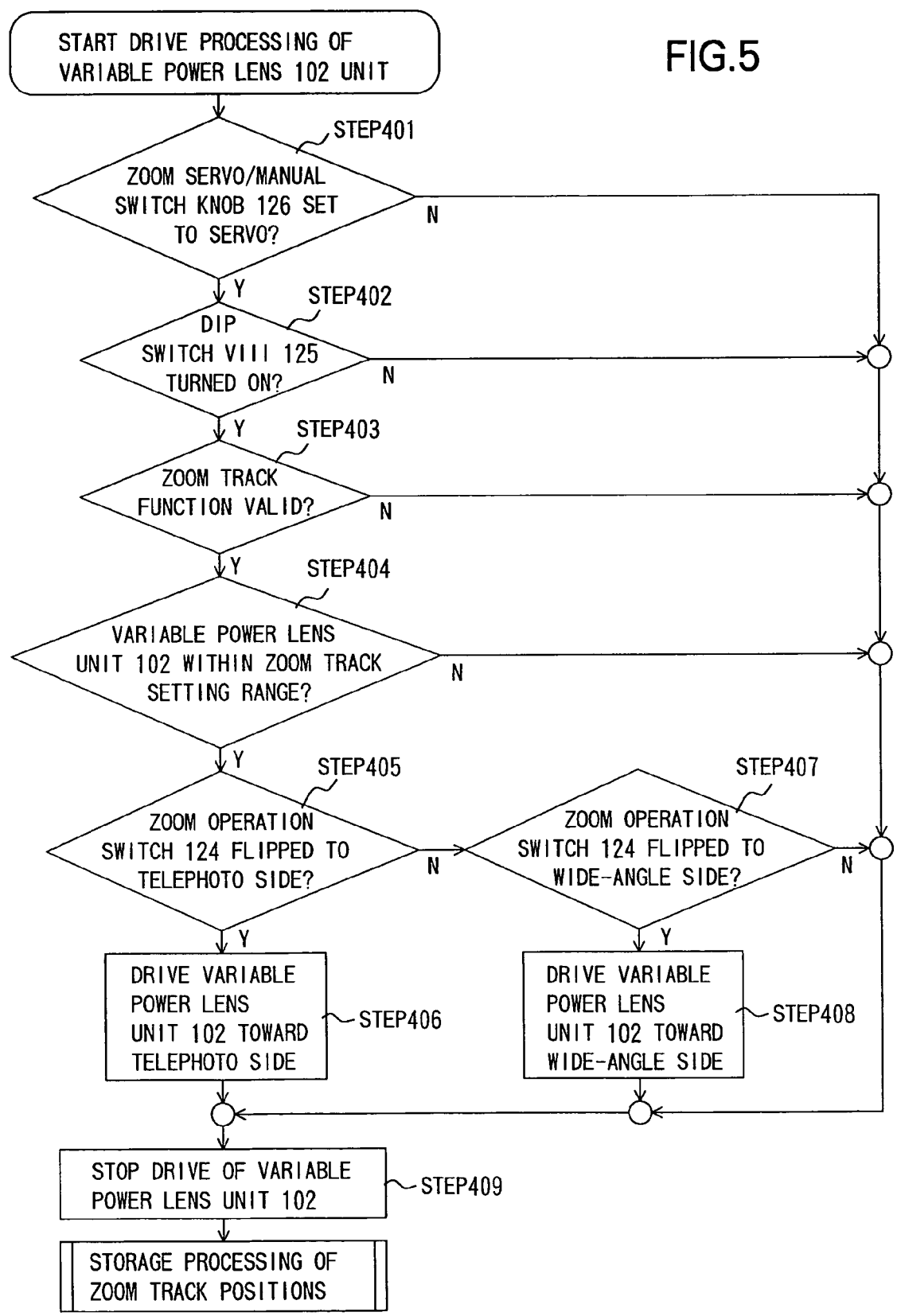
FIG. 5 is a flow chart showing the drive processing procedure of the variable power lens unit in Embodiment 2 of the present invention.

At step 303, the stored contents of the zoom track positions are erased, and then the flow proceeds to drive processing of the variable power lens unit shown in FIG. 5. At step 302, when both of the memory switch 112 and the iris auto-switch 123 are turned on, the flow proceeds to step 304, or when both of the memory switch 112 and the iris auto-switch 123 are not turned on, the flow proceeds to the drive processing of the variable power lens unit shown in FIG. 5.

At step 304, a timer, not shown, is initialized to start counting, and then the flow proceeds to step 305. At step 305, when the timer counts for a certain time period or longer, the flow proceeds to step 307, or when the timer counts for less than the certain time period, the flow proceeds to step 306. At step 306, when the memory switch 112 and the iris auto-switch 123 are not turned on, the flow proceeds to step 305, or when both of the memory switch 112 and the iris auto-switch 123 are turned on, the flow proceeds to step 308.

At step 308, when the position of the variable power lens unit 102 falls within the telephoto area 45, the flow proceeds to step 309, or when the position of the variable power lens unit 102 falls within the wide-angle area 46, the flow proceeds to step 310. At step 309, the position of the variable power lens unit 102 within the telephoto area 45 at that point is stored as the zoom track telephoto position. At step 310, the position of the variable power lens unit 102 is stored as the zoom track wide-angle position. At step 307, when the zoom track function is valid, the flow proceeds to step 311, or when the zoom track function is invalid, the flow proceeds to step 312.

At step 311, the zoom track function is switched to the invalid state. At step 312, the zoom track function is switched to the valid state. After completion of the aforementioned processing, the flow proceeds to the drive processing of the variable power lens unit 102 shown in FIG. 5.

FIG. 5 is a flow chart showing the drive processing procedure of the variable power lens unit 102. The flow chart is performed by the controller 111. In FIG. 5, at step 401, when the zoom servo/manual switch knob 126 is set to the servo position, the flow proceeds to step 402, or when the zoom servo/manual switch knob 126 is not set to the servo position, the flow proceeds to step 409.

At step 402, when the DIP switch VIII 125 is turned on, the flow proceeds to step 403, or when the DIP switch VIII 125 is not turned on, the flow proceeds to step 409. At step 403, when the zoom track function is valid, the flow proceeds to step 404, or when the zoom track function is not valid, the flow proceeds to step 409.

At step 404, when the variable power lens unit 102 is positioned within the zoom track setting range, the flow proceeds to step 405, or when the variable power lens unit 102 is out of the zoom track setting range, the flow proceeds to step 409.

At step 405, when the zoom operation switch 124 is flipped to the telephoto side, the flow proceeds to step 406, or when the zoom operation switch 124 is not flipped to the telephoto side, the flow proceeds to step 407. At step 406, the variable power lens unit 102 is driven toward the telephoto side. At step 407, when the zoom operation switch 124 is flipped to the wide-angle side, the flow proceeds to step 408, or when the zoom operation switch is not flipped to the wide-angle side, the flow proceeds to step 409.

At step 408, the variable power lens unit 102 is driven toward the wide-angle side, and then the flow proceeds to step 409. At step 409, the drive of the variable power lens unit is stopped to proceed to the storage processing of the zoom track positions shown in FIG. 4.

In this manner, the DIP switch VIII 125 is provided with the function of erasing the stored zoom track positions, and the function of switching the valid and invalid states of the zoom track function is added such that the function is triggered by the memory switch 112 and the iris auto-switch 123 turned on simultaneously for the certain time period or longer. Consequently, the erasure of the zoom track positions and the switching between the valid and invalid states of the zoom track function can be achieved separately without newly adding a switch.

In Embodiment 2, the two zoom track positions in the telephoto area and wide-angle area are simultaneously initialized by holding the state in which the memory switch 112 and the iris auto-switch 123 are turned on for the certain time period. Alternatively, it is possible that only one of them is erased depending on the position of the variable power lens unit 102 at that point in the telephoto area or the wide-angle area.

According to the aforementioned structure, an operator can erase the stored contents of the zoom track positions before images are taken without resetting the zoom track positions and can switch between the valid and invalid states of the zoom track function with the stored contents of the zoom track positions maintained, resulting in easier operations and allowing the operator to concentrate on other operations.

Embodiment 3

Valid/Invalid Indicator

In the following, Embodiment 3 of the present invention is described with reference to FIGS. 1, 6 to 8, and 15.

Since description has already been made for FIG. 1, repetitive description thereof is omitted. In addition, basic operations are similar to those in Embodiment 2, so that description thereof is omitted. When both of the memory switch 112 and the iris auto-switch 123 are held on for a certain time period or longer with the zoom track function valid, the zoom track function becomes invalid. In addition, when the variable power lens unit 102 is positioned in the telephoto area 45, the variable power lens unit 102 is driven to the telephoto end, and when it is positioned in the wide-angle area 46, the variable power lens unit 102 is driven to the wide-angle end.

When both of the memory switch 112 and the iris auto-switch 123 are held on for the certain time period or longer with the zoom track function invalid, the zoom track function becomes valid. In addition, when the variable power lens unit 102 is positioned in the telephoto area 45, the variable power lens unit 102 is driven to the zoom track telephoto position, and when it is positioned in the wide-angle area 46, the variable power lens unit 102 is driven to the zoom track wide-angle position.

In other words, in Embodiment 3, the variable power lens unit 102 is driven to the zoom track telephoto position or the zoom track wide-angle position, or the telephoto end or the wide-angle end when the zoom track function is switched between the valid and invalid states, thereby making it possible to indicate that the zoom track function is switched to the valid or invalid state.

Figure 6:
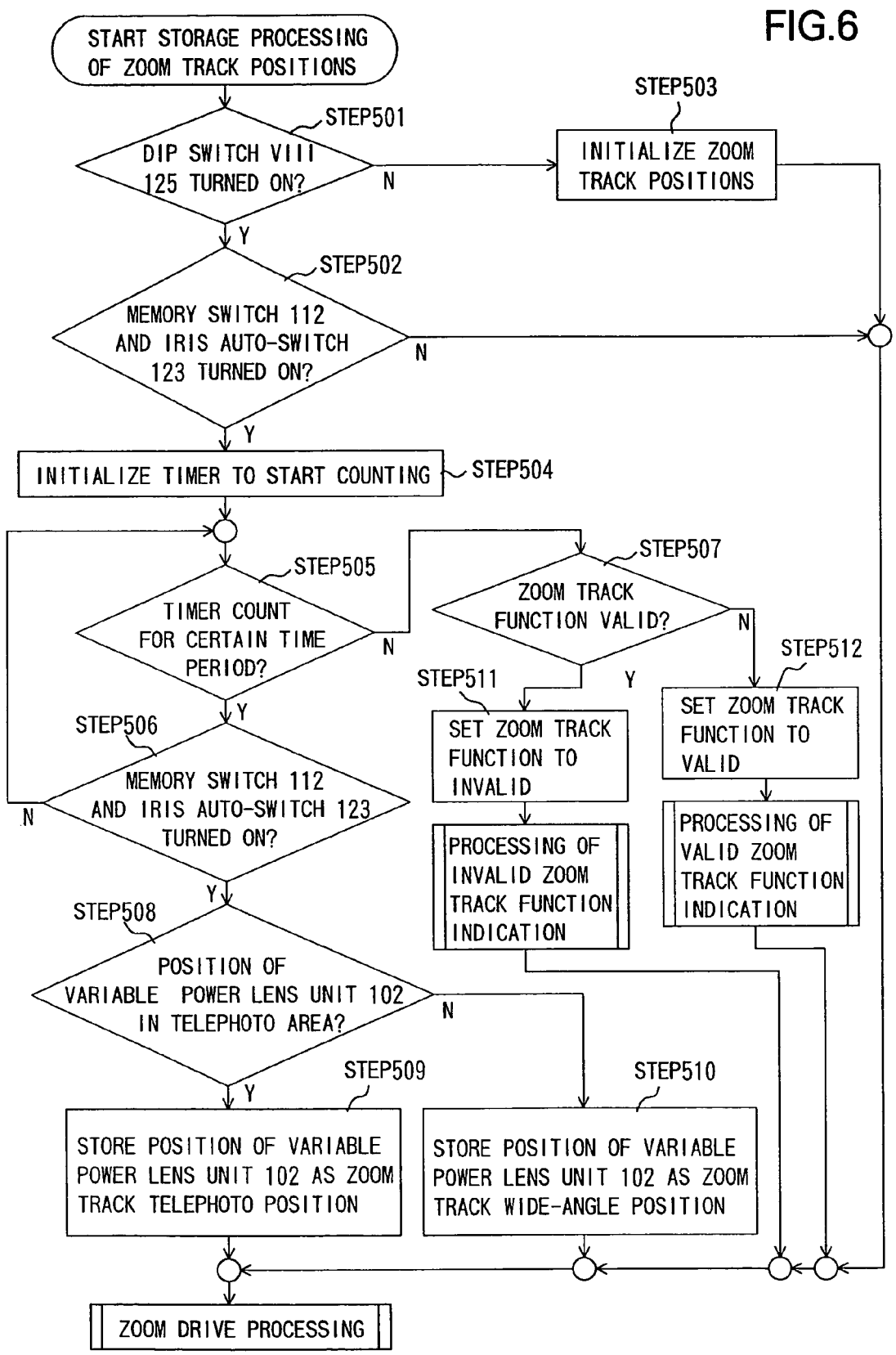
FIG. 6 is a flow chart showing the storage processing procedure of zoom track positions in Embodiment 3 of the present invention.

FIG. 6 is a flow chart showing the storage processing procedure of the zoom track position in Embodiment 3. The flow chart is performed by the controller 111. In FIG. 6, processing from step 501 to 510 are similar to that from step 301 to step 310 shown in FIG. 4, so that description thereof is omitted.

Figure 7:
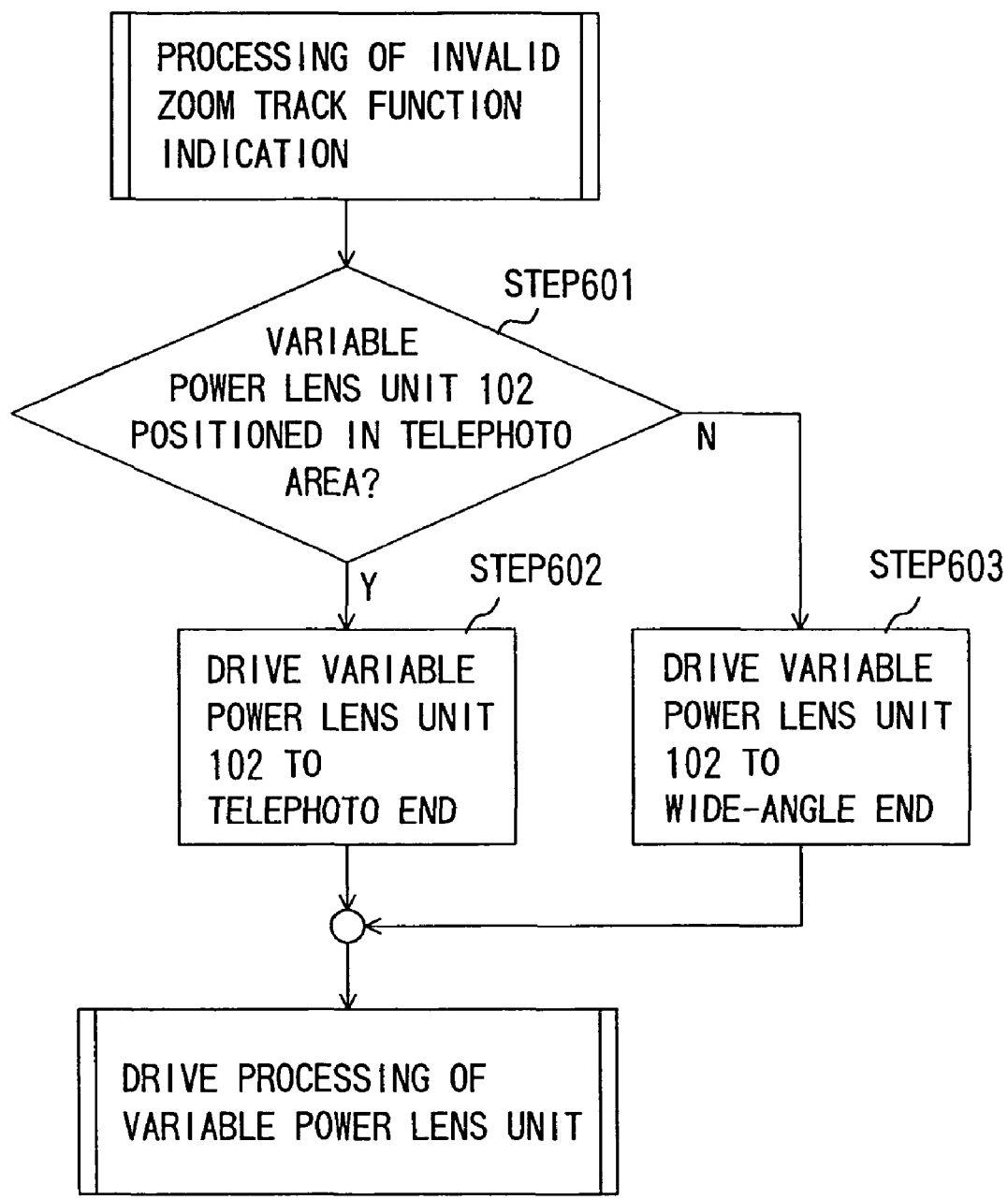
FIG. 7 is a flow chart showing the processing procedure of invalid zoom track function indication in Embodiment 3 of the present invention.

At step 511, the zoom track function is switched to the invalid state, and then the flow proceeds to processing of invalid zoom track function indication shown in FIG. 7. At step 512, the zoom track function is switched to the valid state, and then the flow proceeds to processing of valid zoom track function indication shown in FIG. 8.

FIG. 7 is a flow chart showing the processing procedure of invalid zoom track function indication in Embodiment 3. At step 601, when the variable power lens unit 102 is positioned in the telephoto area 45, the flow proceeds to step 602, or when the variable power lens unit 102 is positioned in the wide-angle area 46, the flow proceeds to step 603.

At step 602, the variable power lens unit 102 is driven to the telephoto end, and then the flow proceeds to the drive processing of the variable power lens unit shown in FIG. 5. At step 603, the variable power lens unit 102 is driven to the wide-angle end, and then the flow proceeds to the drive processing of the variable power lens unit shown in FIG. 5.

Figure 8:
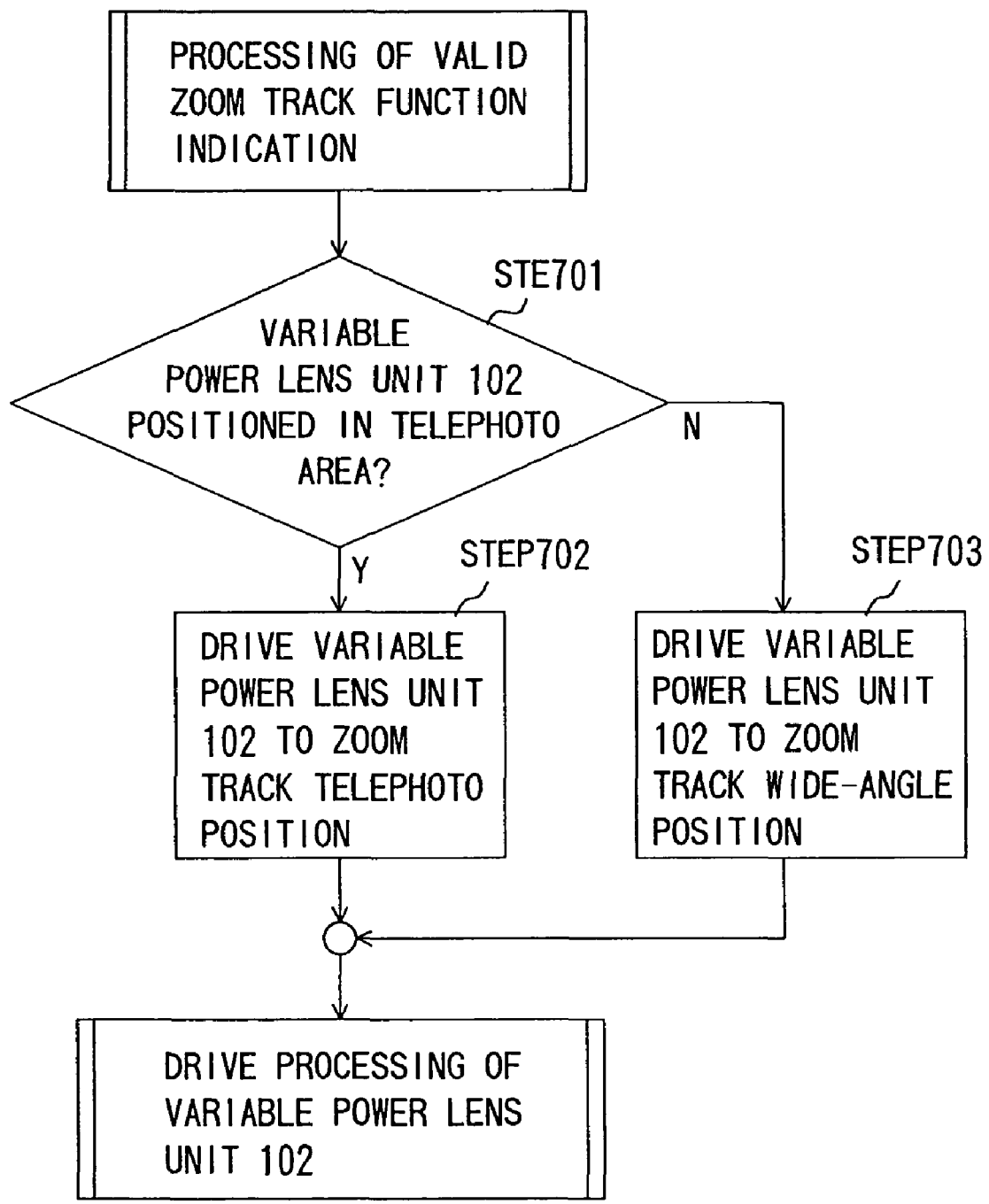
FIG. 8 is a flow chart showing the processing procedure of valid zoom track function indication in Embodiment 3 of the present invention.
Figure 9:
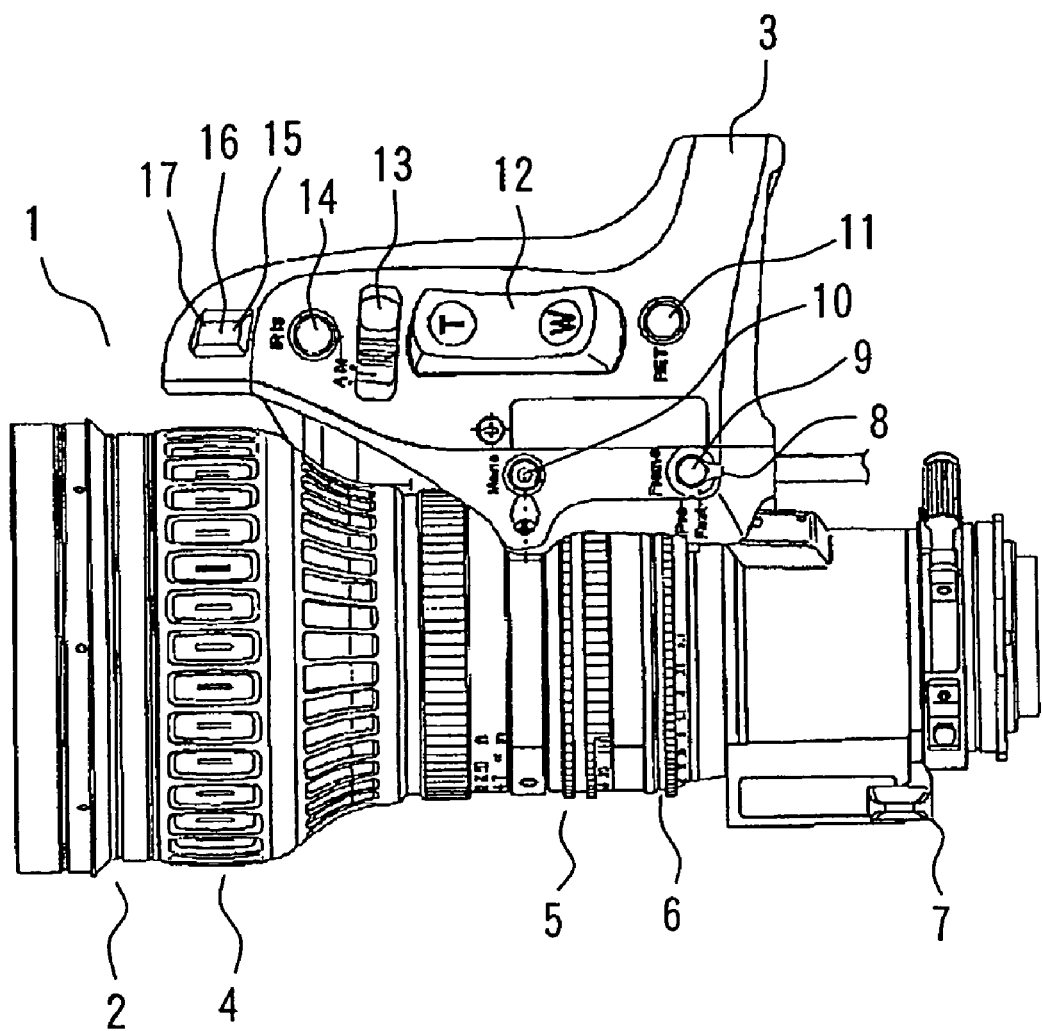
FIG. 9 is a top view of a zoom lens of a prior art.
Figure 10:
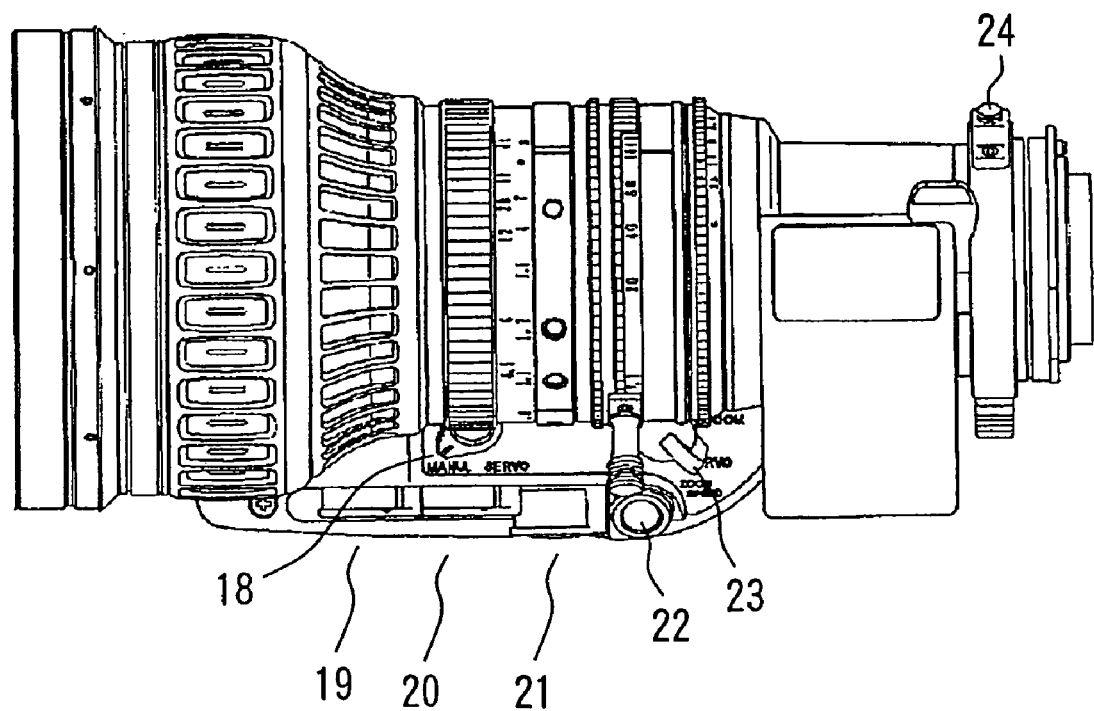
FIG. 10 is a side view of the zoom lens of the prior art.
Figure 11:
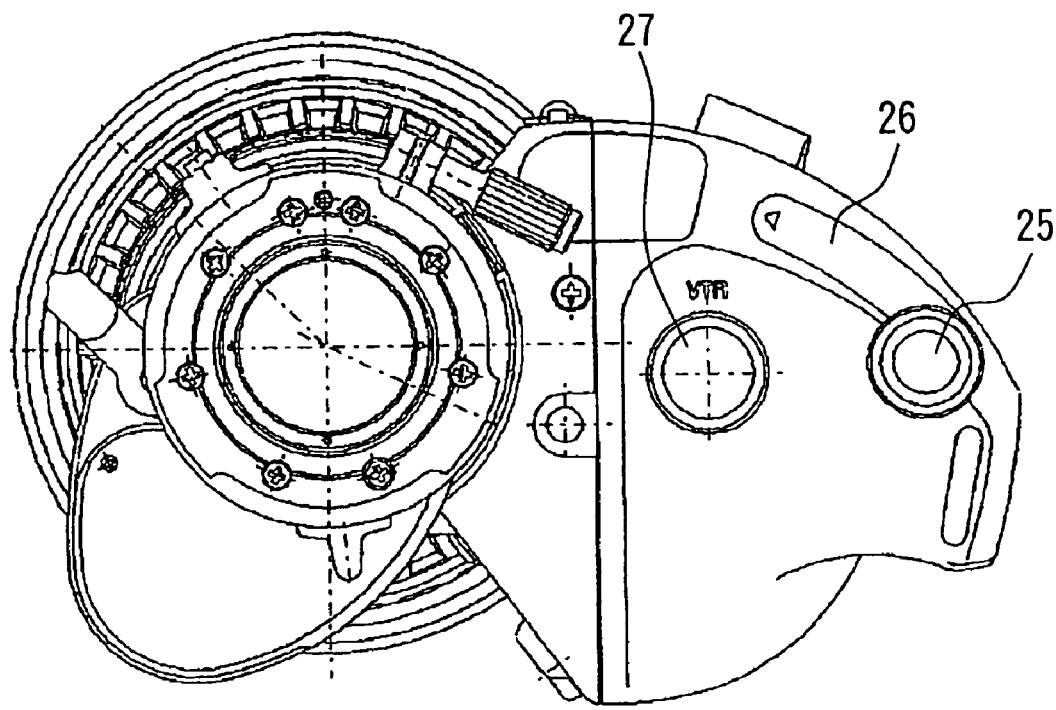
FIG. 11 is a back view of the zoom lens of the prior art.
Figure 12:
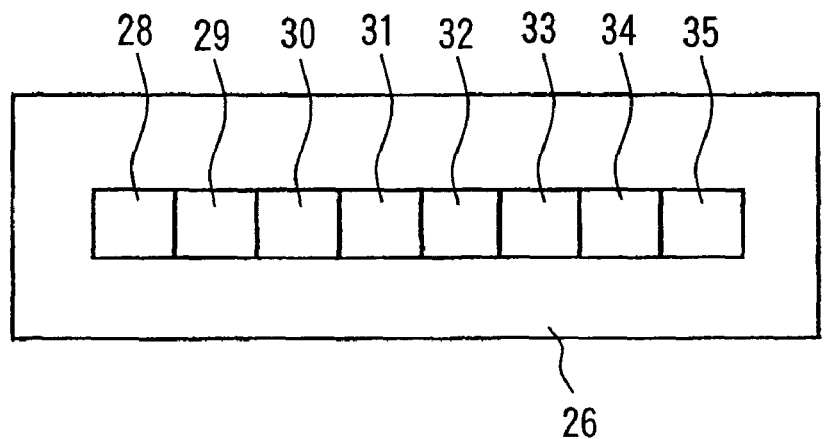
FIG. 12 is a block diagram of DIP switches of the prior art.
Figure 13:
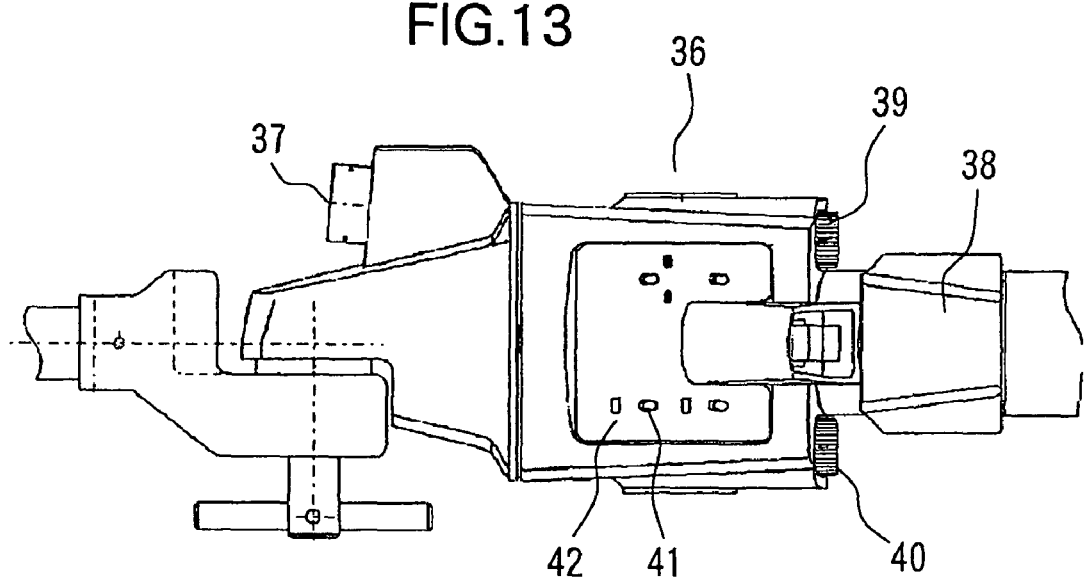
FIG. 13 is a side view of a zoom operation control accessory of the prior art.

FIG. 8 is a flow chart showing the processing procedure of valid zoom track function indication in Embodiment 3. In FIG. 8, when the variable power lens unit 102 is positioned in the telephoto area 45 at step 701, the flow proceeds to step 702, or when the variable power lens unit 102 is positioned in the wide-angle area 46, the flow proceeds to step 703. At step 702, the variable power lens unit 102 is driven to the zoom track telephoto position, and then the flow proceeds to the zoom drive processing shown in FIG. 5. At step 703, the variable power lens unit 102 is driven to the zoom track wide-angle position, and then the flow proceeds to the zoom drive processing shown in FIG. 5.

In this manner, the variable power lens unit 102 is driven to the zoom track telephoto position or the zoom track wide-angle position, or the telephoto end or the wide-angle end when the zoom track function is switched between the valid and invalid states to make the indication of the zoom track function switched to the valid or invalid state. Thus, an operator can visually recognize that the zoom track function is switched to the valid or invalid state.

In Embodiment 3, the variable power lens unit 102 is driven to the zoom track telephoto position or the zoom track wide-angle position, or the telephoto end or the wide-angle end in accordance with the position of the variable power lens unit 102. Alternatively, the operator may visually recognize the zoom track function switched to the valid or invalid state by setting a single fixed drive direction of the variable power lens unit 102 regardless of the position of the variable power lens unit 102.

According to the aforementioned structure, the operator can recognize that the zoom track function is switched to the valid or invalid state without newly setting an indicator. In addition, when the zoom track function is switched to the valid state with the variable power lens unit 102 positioned out of the zoom track setting range, it is possible to prevent erroneous start of image taking out of the zoom track setting range and to eliminate the need to manually move the variable power lens unit 102 into the zoom track setting range. Thus, a focus detection area can be switched quickly, and the operator can concentrate on other operations.

Embodiment 4

In Embodiment 3, the variable power lens unit 102 is driven regardless of whether or not a zoom track position is stored in the storage section 111b in the valid zoom track indication processing. Namely, the variable power lens unit 102 is driven to the telephoto end or the zoom track telephoto position when the variable power lens unit 102 is positioned in the telephoto area, or the variable power lens unit 102 is driven to the wide-angle end or the zoom track wide-angle position when the variable power lens unit 102 is positioned in the wide-angle area.

For example, when only the telephoto position is stored as the zoom track position, the variable power lens unit 102 is moved to the wide-angle end resulting from the valid zoom track indication processing when the variable power lens unit 102 is not positioned in the telephoto area. In this case, the variable magnification lens unit 102 after the valid zoom track indication processing is at the same position as that after the invalid zoom track indication processing, thereby making it impossible to determine whether the zoom track function is valid or invalid.

To address this, when only one of the telephoto position and the wide-angle position is stored as the zoom track position, the variable power lens unit 102 is moved to the set zoom track position in the valid zoom track indication processing regardless of the position of the variable power lens unit 102 to allow visual recognition of whether the zoom track function is valid or invalid.

Embodiment 4 of the present invention is hereinafter described with reference to FIGS. 1, 6, 7, 14, and 15. Since description has already been made for FIGS. 1, 6, 7, and 15, detailed description thereof is omitted.

Figure 14:
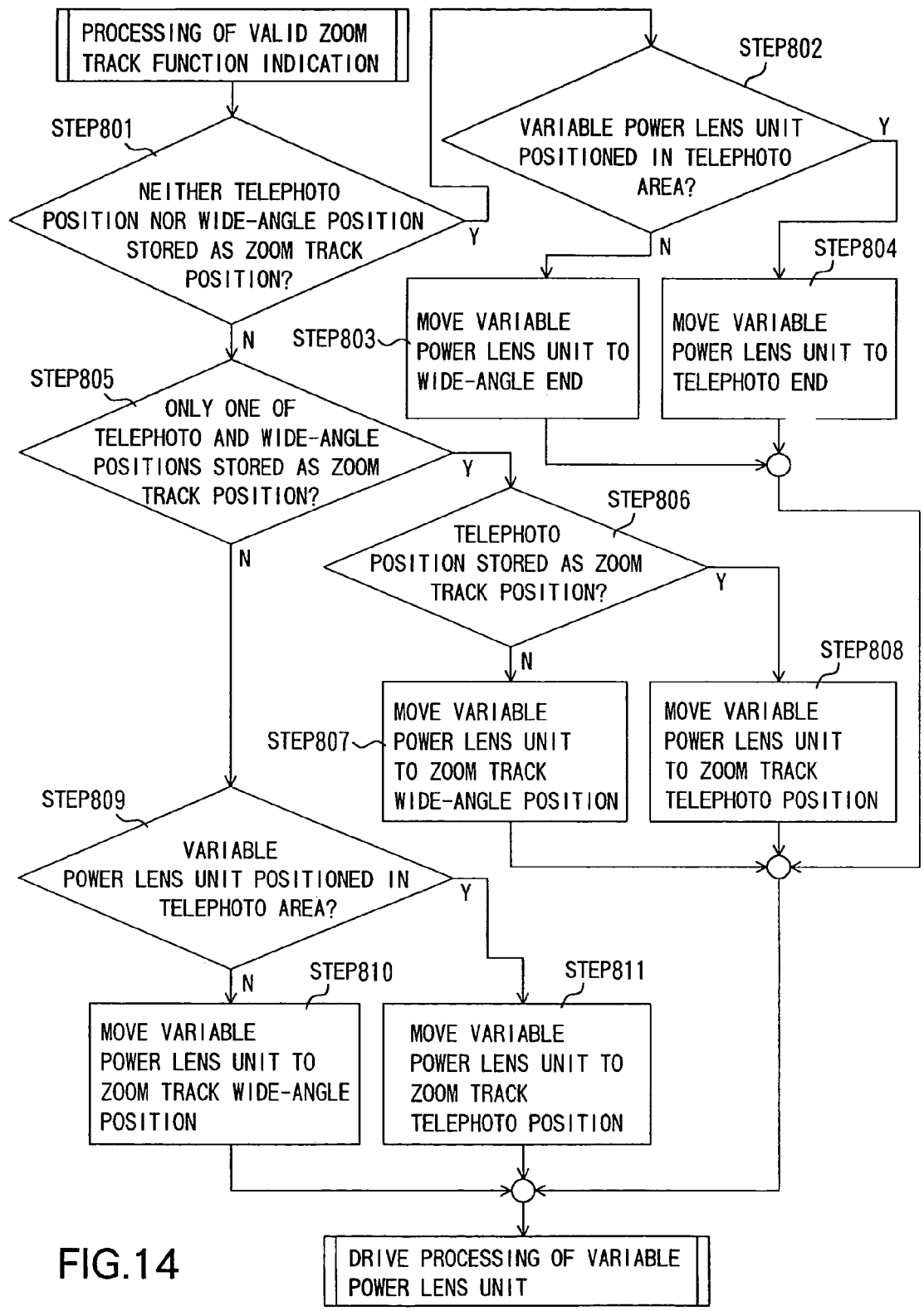
FIG. 14 is a flow chart showing the processing procedure of valid zoom track function indication in Embodiment 4 of the present invention.

FIG. 14 is a flow chart showing the processing procedure of valid zoom track function indication in Embodiment 4. The flow chart is performed by the controller 111. In FIG. 14, at step 801, it is determined whether or not neither a telephoto position nor a wide-angle position is stored as a zoom track position. When neither the telephoto position nor the wide-angle position is stored as the zoom track position, the flow proceeds to step 802 where it is determined whether or not the variable power lens unit 102 is positioned in the telephoto area 45.

When it is determined that the variable power lens unit 102 is positioned in the wide-angle area 46 at step 802, the flow proceeds to step 803 where the variable power lens unit 102 is moved to the wide-angle end. When it is determined that the variable power lens unit 102 is positioned in the telephoto area 45, the flow proceeds to step 804 where the variable power lens unit 102 is moved to the telephoto end.

Then, zoom drive processing is performed. At step 801, when it is determined that neither the telephoto position nor the wide-angle position is stored as the zoom track position, the flow proceeds to step 805 where it is determined whether or not only one of the telephoto position and the wide-angle position is stored as the zoom track position.

When only one of the telephoto position and the wide-angle position is stored as the zoom track position, the flow proceeds to step 806 where it is determined whether or not the stored zoom track position is the telephoto position. At step 806, when the stored zoom track position is not the telephoto position, the flow proceeds to step 807 where the variable power lens unit 102 is moved to the zoom track wide-angle position.

At step 806, when the stored zoom track position is the telephoto position, the flow proceeds to step 808 where the variable power lens unit 102 is moved to the zoom track telephoto position. Then, the zoom drive processing is performed. At step 805, when it is determined that both of the telephoto position and the wide-angle position is stored as the zoom track position, the flow proceeds to step 809.

At step 809, it is determined whether or not the variable power lens unit 102 is positioned in the telephoto area 45. When it is determined that the variable power lens unit 102 is positioned in the wide-angle area 46, the flow proceeds to step 810 where the variable power lens unit 102 is moved to the zoom track wide-angle position. At step 809, when it is determined that the variable power lens unit 102 is positioned in the telephoto area 45, the flow proceeds to step 811 where the variable power lens unit 102 is moved to the zoom track telephoto position. Then, the zoom drive processing is performed.

In this manner, if only one of the telephoto position and the wide-angle position is stored as the zoom track position when the zoom track function is switched to the valid state, the variable power lens unit 102 is moved to the set zoom track position in the valid zoom track indication processing regardless of the position of the variable power lens unit 102. Thus, an operator can visually recognize whether the zoom track function is valid or invalid.

According to the aforementioned structure, the operator can see that the zoom track function is switched to the valid or invalid state without newly setting an indicator. In addition, when the zoom track function is switched to the valid state with the variable power lens unit 102 positioned out of the zoom track setting range, it is possible to prevent erroneous start of image taking out of the zoom track setting range and to eliminate the need to manually move the variable power lens unit 102 into the zoom track setting range. Thus, a focus detection area can be switched quickly, and the operator can concentrate on other operations.

What is claimed is:

1. A drive control apparatus for controlling a lens apparatus having a zoom lens movable between a telephoto end and a wide-angle end, comprising:

an iris auto-switch configured to be operated between on and off to switch whether or not to bring an iris operation into a servo operation;

a memory switch configured to be operated to perform a setting relating to the zoom lens; and a controller configured to store, in a case where a position of the zoom lens at a time when the iris auto-switch and the memory switch are simultaneously turned on is different from those at the telephoto end and at the wide-angle end, the position of the zoom lens as a drive end of the zoom lens, and configured to limit a drive range using the stored drive end, wherein simultaneous turn-on of the iris auto-switch and the memory switch performed for a certain time period switches whether the limitation of the drive range of the zoom lens by the controller is valid or invalid, wherein, when the limitation of the drive range is valid, the zoom lens is allowed to be driven only in a drive range between the stored drive end and the wide-angle end or between the stored drive end and the telephoto end, and when the limitation of the drive range is invalid, the zoom lens is allowed to be driven in an entire range between the wide-angle end and the telephoto end, and wherein the controller drives the zoom lens to the stored drive end when the limitation of the drive range is switched to valid.

2. A drive control apparatus for controlling a lens apparatus having a zoom lens movable between a telephoto end and a wide-angle end, comprising:

an iris auto-switch configured to be operated between on and off to switch whether or not to bring an iris operation into a servo operation;

a memory switch configured to be operated to perform a setting relating to the zoom lens; and a controller configured to store, in a case where a position of the zoom lens at a time when the iris auto-switch and the memory switch are simultaneously turned on is different from those at the telephoto end and at the wide-angle end, the position of the zoom lens as a drive end of the zoom lens, and configured to limit a drive range using the stored drive end, wherein simultaneous turn-on of the iris auto-switch and the memory switch performed for a certain time period switches whether the limitation of the drive range of the zoom lens by the controller is valid or invalid, wherein, when the limitation of the drive range is valid, the zoom lens is allowed to be driven only in a drive range between the stored drive end and the wide-angle end or between the stored drive end and the telephoto end, and when the limitation of the drive range is invalid, the zoom lens is allowed to be driven in an entire range between the wide-angle end and the telephoto end, and wherein the controller drives the zoom lens to the stored drive end when the limitation of the drive range is switched to invalid.

3. A lens system comprising:

a lens apparatus which includes a zoom lens movable between a telephoto end and a wide-angle end; and a drive control apparatus for controlling the lens apparatus, wherein the drive control apparatus comprises:

an iris auto-switch configured to be operated between on and off to switch whether or not to bring an iris operation into a servo operation;

a memory switch configured to be operated to perform a setting relating to the zoom lens; and a controller configured to store, in a case where a position of the zoom lens at a time when the iris auto-switch and the memory switch are simultaneously turned on is different from those at the telephoto end and at the wide-angle end, the position of the zoom lens as a drive end of the zoom lens, and configured to limit a drive range using the stored drive end, wherein simultaneous turn-on of the iris auto-switch and the memory switch performed for a certain time period switches whether the limitation of the drive range of the zoom lens by the controller is valid or invalid, wherein, when the limitation of the drive range is valid, the zoom lens is allowed to be driven only in a drive range between the stored drive end and the wide-angle end or between the stored drive end and the telephoto end, and when the limitation of the drive range is invalid, the zoom lens is allowed to be driven in an entire range between the wide-angle end and the telephoto end, and wherein the controller drives the zoom lens to the stored drive end when the limitation of the drive range is switched to valid.

4. An image-taking system comprising:

a lens apparatus which includes a zoom lens movable between a telephoto end and a wide-angle end;

a drive control apparatus for controlling the lens apparatus; and an image-taking apparatus which has a photoelectrical conversion element which photoelectrically converts a subject image formed by the lens apparatus, wherein the drive control apparatus comprises:

an iris auto-switch configured to be operated between on and off to switch whether or not to bring an iris operation into a servo operation;

a memory switch configured to be operated to perform a setting relating to the zoom lens; and a controller configured to store, in a case where a position of the zoom lens at a time when the iris auto-switch and the memory switch are simultaneously turned on is different from those at the telephoto end and at the wide-angle end, the position of the zoom lens as a drive end of the zoom lens, and configured to limit a drive range using the stored drive end, wherein simultaneous turn-on of the iris auto-switch and the memory switch performed for a certain time period switches whether the limitation of the drive range of the zoom lens by the controller is valid or invalid, wherein, when the limitation of the drive range is valid, the zoom lens is allowed to be driven only in a drive range between the stored drive end and the wide-angle end or between the stored drive end and the telephoto end, and when the limitation of the drive range is invalid, the zoom lens is allowed to be driven in an entire range between the wide-angle end and the telephoto end, and wherein the controller drives the zoom lens to the stored drive end when the limitation of the drive range is switched to valid.

5. An image-taking system comprising:

a lens apparatus which includes a zoom lens movable between a telephoto end and a wide-angle end;

a drive control apparatus for controlling the lens apparatus; and an image-taking apparatus which has a photoelectrical conversion element which photoelectrically converts a subject image formed by the lens apparatus, wherein the drive control apparatus comprising:

an iris auto-switch configured to be operated between on and off to switch whether or not to bring an iris operation into a servo operation;

a memory switch configured to be operated to perform a setting relating to the zoom lens; and a controller configured to store, in a case where a position of the zoom lens at a time when the iris auto-switch and the memory switch are simultaneously turned on is different from those at the telephoto end and at the wide-angle end, the position of the zoom lens as a drive end of the zoom lens, and configured to limit a drive range using the stored drive end, wherein simultaneous turn-on of the iris auto-switch and the memory switch performed for a certain time period switches whether the limitation of the drive range of the zoom lens by the controller is valid or invalid, wherein, when the limitation of the drive range is valid, the zoom lens is allowed to be driven only in a drive range between the stored drive end and the wide-angle end or between the stored drive end and the telephoto end, and when the limitation of the drive range is invalid, the zoom lens is allowed to be driven in an entire range between the wide-angle end and the telephoto end, and wherein the controller drives the zoom lens to the stored drive end when the limitation of the drive range is switched to invalid.

6. A lens system comprising:

a lens apparatus which includes a zoom lens movable between a telephoto end and a wide-angle end; and a drive control apparatus for controlling the lens apparatus, wherein the drive control apparatus comprises:

an iris auto-switch configured to be operated between on and off to switch whether or not to bring an iris operation into a servo operation;

a memory switch configured to be operated to perform a setting relating to the zoom lens; and a controller configured to store, in a case where a position of the zoom lens at a time when the iris auto-switch and the memory switch are simultaneously turned on is different from those at the telephoto end and at the wide-angle end, the position of the zoom lens as a drive end of the zoom lens, and configured to limit a drive range using the stored drive end, wherein simultaneous turn-on of the iris auto-switch and the memory switch performed for a certain time period switches whether the limitation of the drive range of the zoom lens by the controller is valid or invalid, wherein, when the limitation of the drive range is valid, the zoom lens is allowed to be driven only in a drive range between the stored drive end and the wide-angle end or between the stored drive end and the telephoto end, and when the limitation of the drive range is invalid, the zoom lens is allowed to be driven in an entire range between the wide-angle end and the telephoto end, and wherein the controller drives the zoom lens to the stored drive end when the limitation of the drive range is switched to invalid.

* * * * *